United States Patent [19]

Durvasula et al.

[11] Patent Number: 5,103,042
[45] Date of Patent: Apr. 7, 1992

[54] METHOD FOR REDUCING UNSATURATION OF POLYETHERS

[75] Inventors: Visweswara R. Durvasula, Lake Jackson; Franz J. Luxem, Clute, both of Tex.

[73] Assignee: The Dow Chemical Company, Midland, Mich.

[21] Appl. No.: 527,999

[22] Filed: May 23, 1990

[51] Int. Cl.$^5$ .............................................. C07C 69/66
[52] U.S. Cl. ..................................... 560/189; 568/865; 560/198
[58] Field of Search ................. 560/189, 198; 568/865

[56] References Cited

U.S. PATENT DOCUMENTS 3,577,559  5/1971  Horsley ................................ 560/189

OTHER PUBLICATIONS

Tsuji, J. et al., Tetrahedron Letters, No. 7, pp. 613–616, 1979.
Hey, H. et al., Angew Chem. Intem., vol. 12 (1973), #11, pp. 928–929.
Yanada, T et al., Tetrahedron Letters, vol. 28, #39, pp. 4557–4560, 1987.

Primary Examiner—Paul J. Killos

[57] ABSTRACT

Polyethers having terminal allyl unsaturation are subject to hydrogenolysis by reaction with a hydrogen donor in the presence of a n-allyl complex forming catalyst. The product polyethers have extremely low levels of unsaturation, and thus are useful in preparing polyurethanes having improved properties and processing.

10 Claims, No Drawings

METHOD FOR REDUCING UNSATURATION OF POLYETHERS

BACKGROUND OF THE INVENTION

This invention relates to the preparation of polyethers having reduced levels of terminal unsaturation.

Polyethers are well known materials which are useful for, among other things, preparing polyurethanes. The polyethers predominantly used in making polyurethanes are polymers of alkylene oxides such as ethylene oxide, propylene oxide, butylene oxide, and mixtures thereof. The polyethers are commonly prepared by heating the alkylene oxide in the presence of an initiator compound as described later and a basic catalyst such as potassium hydroxide.

Under the conditions of the polymerization reaction, alkylene oxides, in particular propylene oxide, can generate an unsaturated alcohol (or the corresponding oxyanion). In the case of propylene oxide, allyloxy anion (or the corresponding alcohol) is formed. Allyloxy anion acts as a monofunctional initiator in the polymerization reaction, thereby forming monofunctional polyethers (referred to herein as "monols") having terminal unsaturation due to the residue of the unsaturated alcohol. Because of a rearrangement reaction, some of the terminal allyloxy ($CH_2=CH-CH_2-O-$) groups can isomerize to form a propenyloxy ($CH_3-CH=CH-O-$) group.

The problem of alkylene oxide conversion to the allyloxy anion increases substantially as the molecular weight of the polyether increases. Therefore, the amount of monofunctional species increases as the polyether molecular weight increases. Thus, the problem of monol formation is quite small in low equivalent weight polyethers, but as the equivalent weight of the polyether increases above about 500 or so, it starts to become significant. At equivalent weights above about 1000, the problem can be so significant that 10 to 50 mole % or more of the molecules in the polyether are monols.

The monols are undesirable because when a polyurethane is prepared from the polyether, the monofunctional polyethers terminate the polymer chains and thereby limit the molecular weight of the polyurethane. This has been related to certain shortcomings in the physical properties and processing characteristics of the polyurethanes. Thus, it is desirable to reduce the level of monols in the polyether as much as possible in order to improve the properties of polyurethanes made therefrom.

Several attempts have been made to reduce the monol content of polyether polyols. Several of these focus on reducing the amount of alkylene oxide conversion to allyloxy anion so that the monols do not form in the first place. These methods employ special catalysts such as barium hydroxide, or relatively mild reaction conditions. Each results in some decrease in monol formation, but not as much as desired. Moreover, the use of mild reaction conditions has a very substantial drawback in that it drastically slows the rate of polyether formation, and therefore a much longer reaction time is required to prepare the desired product. This has the effect of reducing the capacity of a polyether plant by up to 50% or more, and thus is very disadvantageous.

Other attempts to reduce the monol concentration have involved the elimination of the propenyl-type unsaturation ($RCH_2-CH=CH-O-$, wherein R is hydrogen or inertly substituted alkyl) by acid hydrolysis. This creates a lower aldehyde, (propionaldehyde in the usual case when R is hydrogen) and a polyether diol. This method is effective in reducing the propenyl unsaturation, but does not affect the allyl ($RCH=CH-CH_2-O-$, wherein R is as defined before) unsaturation, which normally constitutes about 70-90% of the unsaturation. Thus, this method does not provide a means to form a very low monol content polyether.

It would therefore be desirable to provide a process in which a polyol with a very low monol content is formed.

SUMMARY OF THE INVENTION

In one aspect, this invention is a process comprising contacting a polyether having terminal unsaturation with a hydrogen donor and a II-allyl complex-forming catalyst, under conditions such that a measurable portion of the terminal unsaturation of the polyether polyol is removed.

In a particularly preferred embodiment of this invention, the process is conducted under acidic conditions in the presence of water.

In another aspect, this invention is a process comprising contacting a polyether having terminal unsaturation with a hydrogen donor and a hydrogenolysis catalyst under conditions such that a measurable portion of the terminal unsaturation of the polyether polyol is removed.

In a third aspect, this invention is a process comprising contacting a polyether having terminal allyl and propenyl unsaturation with (a) a hydrogen donor and a II-allyl complex-forming catalyst under conditions such that the allyl unsaturation is measurably reduced, and (b) water under conditions including a pH of less than 7 such that the propenyl unsaturation is measurably reduced.

In a fourth aspect, this invention is a polyether polyol having an equivalent weight of at least about 1000 and containing at least 50 weight percent oxypropylene ($-O-CH_2-CH(CH_3)-$) linkages, which contains less than 0.02 meq of terminal unsaturation per gram of polyether, as measured by mercuric acetate titration as described herein.

The process of this invention provides a simple yet effective means for reducing the monol content of polyethers to extremely low levels. In the preferred processes, the allyl and propenyl unsaturation are simultaneously reduced. As a result, the product polyether is particularly useful in preparing polyurethanes having improved thermal and physical properties and improved processing characteristics.

DETAILED DESCRIPTION OF THE INVENTION

The polyether used in this invention has terminal unsaturation, i.e., a terminal 2,3-alkenyl group ($HRC=CH-CH_2-$) or a 1,2-alkenyl group ($H_2RC-CH=CH-$). R in the foregoing formulae is hydrogen or an inertly substituted alkyl group, preferably hydrogen or a $C_{1-3}$ alkyl group, most preferably hydrogen. For convenience herein, the unsaturation provided by a 2,3-alkenyl group is referred to as "allyl" unsaturation, whereas the unsaturation provided by a 1,2-alkenyl group is referred to as "propenyl" unsaturation. Most preferably, the unsaturation is a 2,3-propenyl group ($H_2C=CH-CH_2-$), a 1,2-propenyl group ($H_3C-CH=CH-$), or mixture thereof.

In addition to the terminal unsaturation, the polyether also preferably contains at least one hydroxyl group per molecule so that, upon reaction of the terminal unsaturation, a molecule having at least about 2 hydroxyl groups per molecule is obtained.

The polyether is advantageously a polymer or copolymer of an alkylene oxide which is susceptible to conversion to the corresponding alcohol. In such case, the terminal unsaturation at least in part is derived from such conversion and the subsequent polymerization of the alkylene oxide onto the alcohol. Propylene oxide is by far the alkylene oxide most susceptible to such conversion. However, the terminal unsaturation can be purposefully introduced through the use of unsaturated initiator compounds. Accordingly, the preferred polyether is a homopolymer or copolymer of propylene oxide. The most preferred polymers are polymers of propylene oxide or mixtures of propylene oxide and a copolymerizable alkylene oxide, in which the oxypropylene units derived from the propylene oxide constitute at least about 50%, more preferably at least about 65%, most preferably at least about 75% by weight of the polyether. An especially preferred class of polyether is a homopolymer of propylene oxide which is end-capped with up to about 25%, based on the weight of the polyether, of oxyethylene units. Another especially preferred class of polyether is a random copolymer of propylene oxide and up to about 20 weight percent ethylene oxide, based on the weight of randomly fed monomers, which may or may not additionally contain an end-cap of oxyethylene units.

The alkylene oxide is polymerized in the presence of one or more initiator compounds which determine the nominal functionality of the resulting polyether. The functionality of the initiator(s) is not critical to this invention, and initiators having about 1 to about 16 or more active hydrogen atoms at which a polyether chain can be initiated are useful. For use in polyurethanes, initiators having from about 2 to about 8, more preferably about 2 to about 4, most preferably about 2 to about 3 are most useful. Suitable initiators include compounds having a plurality of hydrogen atoms attached to hydroxyl, primary amine, secondary amine, thiol or carboxylic acid groups, or combinations of such groups. Suitable such initiators include those described in U. S. Pat. No. 4,876,019, incorporated herein by reference. Particularly suitable initiators include mono-, di- and trialkanolamines, alkylene glycols and glycol ethers, triols such as glycerine, trimethylolpropane and low equivalent weight polyethers formed therefrom, and aliphatic or, aromatic amines containing at least two amine hydrogen atoms.

Because the problem of alkylene oxide rearrangement becomes increasingly prevalent with increasing equivalent weight of the polyether, the process of this invention is of particular significance when the polyether starting material has an average equivalent weight of at least about 500, preferably at least about 800, more preferably at least about 1000, even more preferably at least about 1300, and most preferably at least about 1500. There is no critical upper limit on equivalent weight of the polyether, except to the extent that the end-use application dictates same. Thus polyethers having an equivalent weight of 20,000 or more can be used in this process, but those polyethers having an equivalent weight of about 7,000 or less, preferably about 5,000 or less, most preferably about 3,000 or less are generally most preferred for forming polyurethanes.

The preferred polyether starting materials are mixtures of polyether polyols and monoalcohols formed by the polymerization of the alkylene oxide onto allyl alcohol. These mixtures often contain about 0.015 to about 0.2, more typically about 0.03 to about 0.1 meq of monofunctional species (as measured by unsaturation content)/gram of polymer, depending on equivalent weight, with monofunctional species contents generally rising with increasing equivalent weight.

In this invention, the polyether is contacted with a hydrogen donor and a II-allyl complex-forming catalyst.

The hydrogen donor useful herein is a source of hydrogen atoms. Although a wide variety of such materials are useful, including hydrogen gas itself, milder hydrogen donors, i.e., those which will not substantially hydrogenate the double bond in the terminal unsaturated group are preferred. These hydrogen donors also preferably are such that they generate hydrogen under relatively mild reaction conditions, i.e., a temperature below the decomposition temperature of the polyether and preferably at a substantially lower temperature as described hereinafter. Suitable and preferred hydrogen donors include low equivalent weight carboxylic acids and salts thereof. Included among these are formic acid, oxalic acid and glycolic acid, and salts thereof. Suitable formic acid salts are those which are soluble in the polyether, or a suitable solvent for the reaction, as discussed below. Exemplary such salts include the ammonium salts, the alkali metal salts and trialkylammonium salts such as trimethylammonium salts, triethylammonium salts, and the like. Preferred salts include ammonium formate, ammonium oxalate, ammonium glycolate, triethylammonium formate, triethylammonium glycolate, triethylammonium oxalate and the like. In general, the acids are preferred since these provide a pH of less than 7 so an additional acid is not needed to conduct hydrolysis of the propenyl unsaturation. Metal hydrides, such as alkali metals salts of boron hydride or aluminum hydride are also useful, though generally less preferred because they leave solid residues and are relatively expensive. Among these, those which are "fugitive", i.e., have gaseous decomposition products, are preferred and formic acid itself is most preferred.

The hydrogen donor is used in at least a stoichiometric amount, based on the amount of terminal unsaturation. A stoichiometric excess is preferably used. Particularly useful amounts of hydrogen donor are such that provide from about 2 to about 15, preferably about 3 to about 12, more preferably about 6 to about 10 equivalents of hydrogen atoms per equivalent of terminal unsaturation.

In this invention, a catalyst for the hydrogenolysis of the unsaturated ether linkage is used. Any material which measurably accelerates the rate of the hydrogenolysis reaction is suitable. Although this invention is not limited to any theory, it is believed that useful metals or metal compounds are those which capable of forming II-allyl complexes with the double bond of the terminal unsaturation group, thereby promoting the scission of the ether linkage. Among the useful catalysts are metals in groups IV-B, V-B, VI-B and VIII of the Periodic Table of the Elements, and compounds thereof such as salts, alloys and organometallic complexes. Among the suitable metals are titanium, tantalum, tungsten, chromium, cobalt, platinum, palladium, and nickel. Among these, the group VIII metals are preferred, including nickel, platinum and palladium, and palladium is particularly preferred on the basis of performance, availability and cost.

The metallic catalysts can be used as the metal, in the form of alloys with one or more other metals, in the form of salts, in the form of coordination compounds, or in other convenient form. Alloys suitable contain at least 1, more preferably at least about 5 weight percent of one or more of the aforementioned metals. Suitable salts include, for example, acetates, halides including chloride and bromide salts, insoluble oxides and the like.

The catalyst may be supported, if desired. It is generally preferred to use solid catalysts, since separation thereof from the product polyether is simplified. Solid catalysts further simplify the use of a continuous process, as it can be used to pack a column through which the reagents are passed in order to conduct the reaction.

As mentioned before, palladium catalysts are particularly preferred. Finely divided metallic palladium, supported palladium catalysts such as palladium-on-carbon, or palladium-on-alumina, palladium- on-silica, palladium (II) acetate, palladium (II) chloride, palladium (II) bis(triphenylphosphine) chloride, bis(pentanedionato) palladium (0), palladium (II) bis(benzonitrile) chloride and tetrakis(triphenylphosphine) palladium (0) are all preferred palladium catalysts. It is sometimes preferred to use these palladium catalysts in conjunction with the ligand triphenylphosphine ($PPh_3$), which may be added separately so the complex forms in situ.

The catalyst is used in an amount sufficient to measurably increase the rate of hydrogenolysis reaction. It is preferred that the catalyst concentration be such that the reaction proceeds to the desired percent completion in a commercially feasible time, such as in about 10 hours or less, preferably in about 5 hours or less. In general, suitable amounts for that purpose range from about 0.001 to about 1, preferably about 0.01 to about 0.5 weight percent of catalyst based on the weight of the polyether.

It is greatly preferred to conduct the reaction in the presence of water. It has been found that the presence of water improves the facility of the hydrogenolysis reaction, and thus improves the process in that manner. In addition, under acidic conditions the water will hydrolyze the propenyl type ether groups, thus further reducing the unsaturation of the polyether. Further, when carboxylic acids or their amine or ammonium salts are used as the hydrogen donor, they can cap the terminal hydroxyl groups to form esters, thereby reducing the hydroxyl content of the product, The presence of water prevents such capping from occurring.

The amount of water may range broadly. When propenyl-type unsaturation is present, the water should be present in at least about a stoichiometric amount based on the amount of propenyl-type unsaturation. However, it is preferred in any case to employ somewhat greater amounts, such as at least about 0.5, preferably at least about 1, more preferably at least about 5 weight percent water, based on the weight of the polyether. The upper limit on the use of water is determined solely by convenience of the practitioner. Preferably, up to about 1000, more preferably up to about 100, more preferably up to about 50 weight percent water is used, based on weight of polyether, as such amounts permit good results without the need to unduly increase volumes or the need to remove large amounts of water from the product. In processes wherein the hydrogen donor commonly contains some water, as is the case with formic acid which is conveniently used as an aqueous solution containing 4% or more water, the water carried with the hydrogen donor is often sufficient to promote the hydrolysis of the propenyl unsaturation, but it is generally desired to add more water if it is desired to prevent capping of the hydroxyl groups.

The process is conducted at a temperature sufficient to achieve a convenient reaction rate, but at a temperature less than the temperature at which significant decomposition of the polyether occurs. It is preferred to use relatively mild temperatures, i.e., below about 150° C., preferably below about 120° C., more preferably below 110° C. Temperatures above about 40° C., more preferably about 50° C. are preferred in order to achieve faster reaction rates. A temperature of about 65° to about 120° C. is most preferred.

The time required for this of course varies substantially according to the level of catalyst, used, the particular temperature employed, the particular polyether used and its initial and desired levels of unsaturation, whether a continuous or batch process is used, and other factors. In general, the required time can range from about 10 minutes to about 10 hours, preferably about 30 minutes to about 5 hours.

Since various gases may be generated in the process including alkenes, hydrogen, carbon dioxide (when certain acids are used), it is preferred to conduct the process such that a build-up of pressure is avoided.

A solvent or diluent may be used in the reaction, but is not necessary, particularly in the usual case where the polyether is a liquid. However, a solvent or diluent may be useful in some instances, such as where the particular polyether is a solid or is viscous, or to improve heat transfer, or for other reasons. Suitable solvents or diluents include alkanols such as methanol, ethanol, propanol and t-butanol, water, water/alkanol mixtures, particularly mixtures of water with a major amount of ethanol, dioxane, tetrahydrofuran, ketones such as acetone, dimethylformamide and the like. When used, ethanol/water mixtures are particularly preferred. The amount of solvent used is not critical, being limited by considerations such as the handling of large volumes, solubility requirements, heat transfer considerations and the like. Preferably, the solvent is used in a amount less than about 10 times the weight of the polyether, and more preferably less than about 2 times the weight of the polyether.

The reaction is readily conducted by mixing the polyether, catalyst, hydrogen donor, water and any other desired components and heating to a suitable temperature. The order of addition in not particularly critical except as may be needed in any particular instance to promote dissolution of materials. In the typical case where it is desired to remove the majority of terminal unsaturation, heating at the stated temperature until the visible evolution of gas stops is preferred.

As mentioned before, the process of this invention can be conducted batch-wise or continuously. It is contemplated that a continuous operation would be employed in most commercial operations. For example, a polyol/hydrogen donor/water mixture can be continuously passed through a column packed with a supported or solid catalyst in order to conduct the reaction.

Since the polyether starting material is typically prepared by a base-catalyzed polymerization reaction, it is preferred to neutralize the polyether prior to conducting this process in order to remove any residual base.

In this process, the terminal unsaturation of the polyether is advantageously reduced by at least about 50%, preferably at least about 75%, more preferably at least about 85%. The product polyether preferably has less than about 0.025, more preferably less than about 0.015, most preferably less than about 0.01 meq/g of terminal unsaturation, as measured by mercuric acetate titration according to ASTM D-2849-69. In some instances, values below 0.005 are obtained.

Using the preferred starting materials, polyether polyols containing monol impurities, the product of this process is a mixture of difunctional species formed in the hydrogenolysis reaction as well as polyfunctional species having the same functionality as the initiator compound. The mixture thus has an average functionality which is significantly higher than that of the starting mixture. In particular, it has a substantially reduced proportion of monols.

The product polyether can be aminated according to processes such as described in U. S. Pat. Nos. 3,654,370, 4,772,750 and 4,847,416, all incorporated herein by reference.

Accordingly, the polyether polyol mixture is useful in preparing polyurethanes. The polyether can be used in preparing flexible polyurethane foam, as described, for example, in U. S. Pat. No. 4,863,976, in preparing polyurethane and/or urea elastomers, both in cast and RIM processes, as described, for example, in U. S. Pat. Nos. 4,701,476 and 4,269,945, in making rigid polyurethane foam, as described in U. S. Pat. No. 4,632,943, for making thermoplastic polyurethanes, as described in U. S. Pat. No. 4,202,957, as well as for making other types of polyurethanes such as sealants, adhesives, coatings and the like.

The following examples are given to illustrate the invention but are not intended to limit the scope thereof in any way. Unless stated otherwise, all parts and percentages are given by weight.

EXAMPLE 1

Into a suitable vessel are charged 50 parts of an allyl alcohol-initiated poly(propylene oxide) having an equivalent weight of 1954 and 0.512 meq of terminal unsaturation/gram, 0.3 parts of particulate palladium acetate, 0.7 parts of triphenylphosphine, 4.7 parts of ammonium formate and 100 parts of an 80/20 mixture of ethanol and water. This mixture is heated, and evolution of gas is noticed when the temperature of the reaction mixture reaches about 50° C. The temperature is increased to about 78° C. over a 45-minute period and maintained at that temperature for about 3.75 hours, until gas evolution ceases. The resulting mixture is filtered and the solvents removed under vacuum at about 100° C. About 41 parts of a polyether having an equivalent weight of about 1440 is obtained. The sharp reduction in equivalent weight is evidence that a significant proportion of the terminal allyl unsaturation has been removed to generate terminal hydroxyl groups.

EXAMPLE 2

Into a suitable vessel are charged 50 parts of an allyl alcohol-initiated poly(propylene oxide) having an equivalent weight of 1954 and 0.512 meq of terminal unsaturation/gram, 0.3 parts of particulate palladium acetate, 0.7 parts of triphenylphosphine, 3 parts of formic acid (96%) and 100 parts of an 80/20 (volume ratio) mixture of ethanol and water. This mixture is heated, and evolution of gas is noticed when the temperature of the reaction mixture reaches about 55° C. The temperature is increased to about 75° C. over a 45-minute period and maintained at that temperature for about 2.5 hours. The resulting mixture is filtered and the solvents removed under vacuum at about 100° C. About 45 parts of a polyether having an equivalent weight of about 1169 is obtained. The sharp reduction in equivalent weight is evidence that most of the terminal allyl unsaturation has been removed to generate terminal hydroxyl groups.

EXAMPLE 3

In a suitable vessel are placed 160 parts ethanol, into which are suspended 0.1 part of palladium acetate and 0.25 parts triphenylphosphine. This mixture is heated to 50° C. to dissolve the catalyst an triphenylphosphine, and then are added 200 parts of the monol of Examples 1 and 2, 40 parts water and 12.0 parts formic acid (96%). This resulting mixture is heated to about 83° C. Gas evolution is seen when the mixture's temperature reaches about 73° C. After heating for abut 3 hours at 73°-83° C., the mixture is cooled, and evaporated to dryness. The dried mixture has a pH of 3.7 This mixture is dissolved in ethyl acetate, washed with a 55 sodium bicarbonate solution, dried over magnesium sulfate and further dried under vacuum. About 180 grams of a 6.8 pH polyol is obtained. It contains 0.0625 meq/g unsaturation, indicating that nearly 90% of the terminal unsaturation has been removed. The equivalent weight is about 1314, which indicates that the terminal unsaturation groups have been converted to hydroxyl groups.

This experiment is repeated, this time using 0.05 parts of palladium acetate and 0.125 parts triphenylphosphine. The product has 0.11 meq/g unsaturation and an equivalent weight of 1298.

EXAMPLE 4

In a suitable vessel are placed 200 parts of a 1645 equivalent weight, nominally trifunctional poly(propylene oxide) which contains about 14% oxyethylene end-capping. This polyol contains 0.061 meq/g terminal unsaturation. To the polyol are added 0.1 part palladium acetate, 0.25 parts triphenylphosphine, 5 parts formic acid (96%), and 200 parts of an 80/20 (by volume) mixture of ethanol and water. This mixture is heated at a temperature of about 80°-85° C. for about 7 hours, and then worked up as described in Example 3. About 180 parts of a polyol having a pH of 8.5 are obtained. This polyol contains 0.013 meq/g of terminal unsaturation and has an equivalent weight of about 1545.

When this experiment is repeated, except 0.05 part palladium acetate, 0.125 part triphenylphosphine and 5 parts formic acid (96%) are used, a polyol containing 0.022 meq/g unsaturation and an equivalent weight of about 1604 is obtained.

EXAMPLE 5

In a suitable vessel are placed 200 parts of the polyol of Example 4, 0.05 parts palladium acetate, 5 parts formic acid (96%) and 200 parts of an 80/20 (by volume) mixture of ethanol and water. This mixture is heated and worked up as in Example 4 to yield a polyol containing about 0.014 meq/g unsaturation and having an equivalent weight of about 1550. This experiment establishes that excellent results are obtained in the absence of a triphenylphosphine ligand.

EXAMPLE 6

In a suitable vessel are placed 200 parts of the polyol of Example 4, 2 parts of a wet (~50% water) 3% palladium-on-carbon catalyst, 5 parts of formic acid (96%), and 200 parts of an 80/20 (by volume) mixture of ethanol and water. This mixture is heated and worked up as in Example 4 to yield a polyol containing 0.008 meq/g unsaturation and an equivalent weight of about 1453. By proton NMR analysis, the polyol contains 0.004 allyl unsaturation and propenyl unsaturation at a level below the level of detection. The unsaturation analyses by titration often do not quantitatively match those obtained by NMR: however, the NMR data reliably establishes that both propenyl and allyl unsaturation are reduced.

When this experiment is repeated using 1 part of the palladium-on-carbon catalyst, the resulting polyol contains 0.021 meq/g unsaturation and has an equivalent weight of 1545. When repeated again using 0.5 part palladium-on-carbon catalyst, the resulting polyol contains 0.024 meq/g unsaturation.

For comparison, this experiment is repeated omitting the palladium-on-carbon catalyst. The resulting polyol contains 0.053 meq/g unsaturation, indicating the removal of propenyl unsaturation by hydrolysis, but no removal of allyl unsaturation. This is verified by proton NMR analysis, which shows propenyl unsaturation at the limits of detection, but about 0.05 meq/g allyl unsaturation.

EXAMPLE 7

The process of Example 6 is repeated, this time using 200 parts of a 1056 equivalent weight, nominally difunctional poly(propylene oxide) containing 12% oxyethylene end capping and an initial unsaturation of 0.025 meq/g. The product contains 0.0026 meq/g unsaturation and has an equivalent weight of about 1006.

When the process of Example 6 is repeated using a 1619 equivalent weight, nominally trifunctional poly(propylene oxide) containing 0.023 meq/g unsaturation, the product contains 0.0021 meq/g unsaturation and has an equivalent weight of 1560.

The product polyols have extremely low levels of unsaturation. Thus, the process is seen to be effective even with polyols initially containing relatively low levels of unsaturation.

EXAMPLE 8

In a suitable vessel are added 200 parts of the polyol of Example 4, 2 parts of a wet (~50% water) 3% palladium-on-carbon catalyst, 5 parts of formic acid (96%) and 10 parts water. This mixture is heated to about 110° C. for about 4 hours, and worked up as in Example 4. The product contains 0.0030 meq/g unsaturation and has an equivalent weight of about 1466. Thus, a polyol containing an extremely low level of unsaturation is obtained in this process without the use of a solvent.

EXAMPLE 9

Example 8 is repeated, this time substituting a dry 3% platinum-on-carbon catalyst for the palladium catalyst used in Example 8. The unsaturation of the product is 0.011 meq/g, and the equivalent weight is reduced to about 1545.

EXAMPLE 10

Example 8 is again repeated, this time omitting the water (except for the 4% water impurities in the formic acid). The resulting product has 0.003 meq/g unsaturation, indicating that the absence of water does not affect the efficacy of the hydrogenolysis and hydrolysis reactions. However, the product has an equivalent weight of 1858, indicating that despite the removal of the terminal unsaturation, there are fewer hydroxyl groups in the product. FT-IR analysis of the resulting polyether shows an absorbtion at 1726 cm$^{-1}$ which is typical for an ester carbonyl group. This absorption is not present in the starting material or the product of Example 8. Therefore, the formation of terminal formate ester groups is indicated when sufficient water is not present.

What is claimed is:

1. A process comprising contacting a polyether having at least one hydroxyl group and allyl terminal unsaturation with a II-allyl complex-forming catalyst and a stoichiometric amount of a hydrogen donor, based on the amount of said allyl terminal unsaturation, at a temperature below that at which significant decomposition of the polyether occurs, whereby a measurable portion of said allyl terminal unsaturation of the polyether polyol is removed and the corresponding polyether having an additional hydroxyl group is obtained.

2. The process of claim 1 wherein the polyether contains at least 50 weight percent oxypropylene units derived from propylene oxide, and has an equivalent weight of at least about 500.

3. The process of claim 2 wherein the monofunctional polyether further contains propenyl terminal unsaturation.

4. The process of claim 3 which is conducted under acidic conditions in the presence of water.

5. The process of claim 4 wherein the hydrogen donor is a low equivalent weight carboxylic acid or salt thereof, and the II-allyl complex-forming catalyst is palladium or platinum, an alloy of palladium or platinum, an insoluble palladium or platinum salt or a coordination complex of palladium or platinum.

6. The process of claim 5 wherein the hydrogen donor is formic acid or ammonium formate and the II-alkyl complex-forming catalyst is palladium, or a salt or coordination complex thereof.

7. A process comprising contacting a polyether having at least one hydroxyl group and allyl terminal unsaturation with a hydrogenolysis catalyst and a stoichiometric amount of a hydrogen donor, based on the amount of said allyl terminal unsaturation, at a temperature below that at which significant decomposition of the polyether occurs, whereby a measurable portion of the said allyl terminal unsaturation is removed and the corresponding polyether having an additional hydroxyl group is obtained.

8. The process of claim 7 wherein the polyether contains at least 50 weight percent oxypropylene units derived from propylene oxide, and has an equivalent weight of at least about 500, the hydrogen donor is formic acid, oxalic acid, glycolic acid or an ammonium salt thereof, and the hydrogenolysis catalyst is palladium, an insoluble salt of palladium or a coordination complex of palladium.

9. A process comprising contacting a monofunctional polyether having terminal allyl and propenyl unsaturation with (a) a stoichiometric amount of a hydrogen donor, based on the amount of said unsaturation and a II-allyl complex-forming catalyst, and (b) water, said contacting being done at a temperature below that at which significant decomposition of the polyether occurs and a pH of less than 7, whereby the amount of such allyl and propenyl unsaturation are measurably reduced and the corresponding polyether having an additional hydroxyl group is obtained.

10. A polyester polyol having an equivalent weight of at least about 1000 and containing at least 50 weight percent oxypropylene linkages, which contains less than 0.02 meq of terminal unsaturation per gram of polyether, as measured by mercuric acetate titration.

* * * * *